Figure 1:
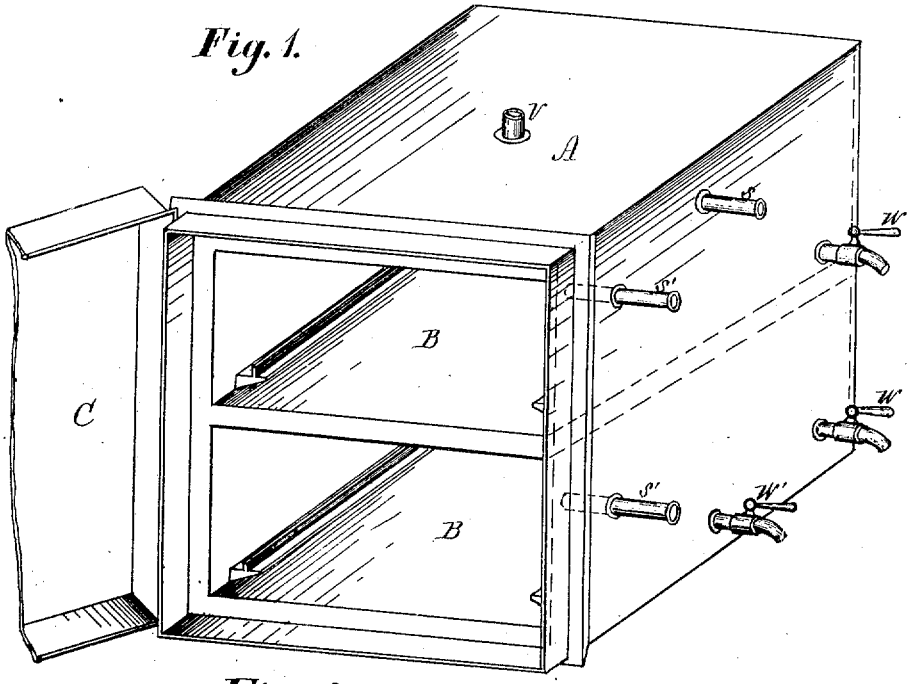

No. 4,479. REISSUED JULY 25, 1871.

J. ASHCROFT.

PROCESS OF TREATING COFFEE.

2 SHEETS—SHEET 1.

Witnesses;

Alex. Wagner.

Lewis B. Wynne, Jr.

Inventor:

John Ashcroft, by Johnson, Klaucke & Co.

his attorneys.

No. 4,479.
REISSUED JULY 25, 1871.
J. ASHCROFT.
PROCESS OF TREATING COFFEE.
2 SHEETS—SHEET 2.
Division A.
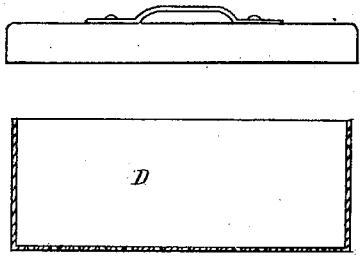
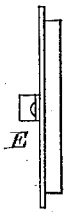
Fig. 3.
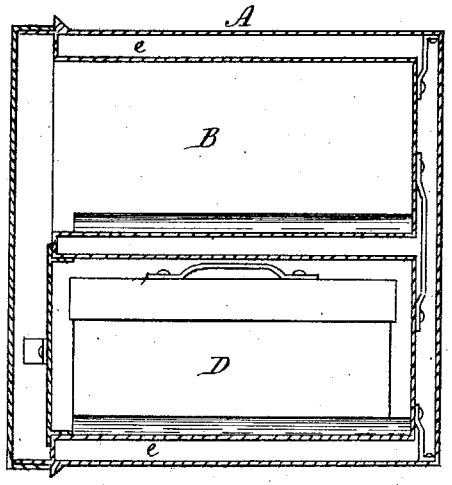
Fig. 4.
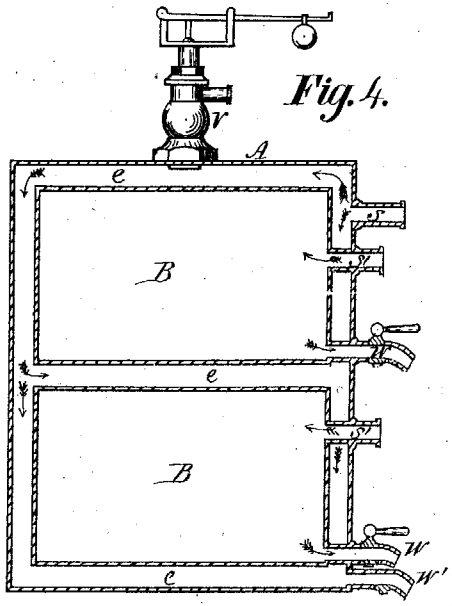
Witnesses:
Wm. Wagner
Lewis B. Wynne, Jr.
Inventor:
John Ashcroft,
by Johnson, Klauche & Co
his attorneys.

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN PROCESSES FOR TREATING COFFEE.

Specification forming part of Letters Patent No. 113,532, dated April 18, 1871; reissue No. 4,479, dated July 25, 1871.

DIVISION A.

*To all whom it may concern:*

Be it known that I, JOHN ASHCROFT, of Brooklyn, in the county of Kings and State of New York, have invented a new and useful Process for Treating the Raw Coffee-Berry by Coloring and Maturing it, of which the following is a specification:

It is well known to importers of certain kinds of coffee that its value is increased in proportion to the yellowness or brownness of its color, showing maturity. Coffee when first shipped is generally of a pale-green color and of a soggy appearance, but on its arrival in this or other countries sometimes turns out of a very handsome yellow, brown, or golden color, and of matured appearance, which materially increases its commercial and other value. It has been ascertained that the vessels which have turned out the brownest and most matured coffee on arriving at their destination are those which have experienced the longest and stormiest voyages, and which have been obliged by stress of weather to keep the hatches closely battened down, thus keeping the coffee entirely without ventilation, so that, in consequence of the warmth produced by close confinement in the hold of the vessel, it becomes gradually heated, and its color changed thereby from the pale green to more or less of the yellow or brown color, according to the length of the voyage and consequently of the confinement of the coffee. On the other hand, those vessels which have made quick voyages with fair weather, and have been open during the passage and well ventilated, have invariably turned out the coffee in nearly the same condition as to color and matured appearance as when originally shipped. Coffee when thoroughly colored, browned, or matured is much more valuable to commerce than pale coffees, which contain heavy "green" berries, which do not roast evenly, and also give out a bitter taste; hence my new process is to accomplish rapidly what it otherwise takes a long time or lapse of years to accomplish, and with a large percentage of gain; and by my process there is less loss in weight and shrinkage, none of the essential properties of the coffee being destroyed, all the coffee-grains being evenly colored and uniformly dry, presenting no unevenness, and not requiring so many different processes when prepared for use. The coffee is greatly improved in appearance and drinking qualities, making it more desirable both to those who deal in it in the raw state and also to those who prepare it for final consumption. The process of sweating, coloring, and maturing coffee, which increases its commercial value, is well known to importers. When a cargo is dampened by water or moisture it heats and sweats, thus imparting to the coffee a rich yellow color. The manner in which I treat unmatured or pale-green coffee produces this much-desired result and greatly enhances its value, as has been proven by experiment. In Arabia coffee ripens fully on the trees. It is shaken off, dried in the shade, and is of a superior quality, the small berries attaining their seasoning in some three years. East and West India coffee is cured by exposing layers of the fruit several inches thick to the heat of the sun, so that fermentation takes place. The worst coffee in America will, in from ten to fourteen years, become as good and acquire as high a flavor as the best we now have from Turkey.

My process, in a measure, disperses the fragrant volatile oil called caffeine from near the outer shell through the solid substance, thus enabling the raw bean to be exposed to the atmosphere with less detriment. Raw coffee is liable to be damaged by absorbing the odors of other substances, such as sugar, spices, &c., and when so damaged my process remedies the injury and restores the coffee to its natural condition in addition to producing the desirable coloring and maturing. By applying steam directly in proper quantities to the coffee, so as to heat and sweat it in a chamber or compartment, I supply the desired moisture to produce sweating, which, being aided by drying heat, the sweating, coloring, and maturing process is thus accomplished in from one to four days, instead of so many years, the economy of which is obvious. Damaged cargoes of coffee can be saved by my process to a great extent. I can carry out the same principle on a large scale by taking rooms or halls of any desirable size, supplying the moistening steam for sweating and expanding the berries, and other heat, such as hot air, for drying and browning, by means of pipes or otherwise. In this way, in a room having tiers of perforated shelves covered with bags of coffee, ventilation being cut off, and into which room or rooms steam can be introduced, and also dry heat, by means of coils of pipe or otherwise, the steam being introduced beneath the rows or tiers of shelves, I can cure a whole cargo of coffee at one time, producing the desired result in a short time, accomplishing the same change in giving the raw coffee its most desirable color and rich flavor in a comparatively few hours, which experience has shown could only be attained in a satisfactory manner under a long voyage in the close hold of a ship. In restoring to cargoes of coffee rendered unfit for use a highly natural and rich flavor, and in rendering unnecessary the practice of storing coffee away in ships in spices, hides, &c., to produce heat and sweating during transportation, renders my process of treating coffee of almost incalculable value, not only in the traffic, but to the consumer. It moreover lessens the care and expense in its transportation. By my process, also, the coffee receives a partial roasting—that is to say, it is browned, dried, and rendered comparatively light and rich instead of heavy and soggy, and therefore does not require so long a time nor so great a heat, and, besides, roasts more uniformly in the roasting for consumption than green coffee. Another great advantage derived from my new process is that while the best grades of old Government Java are improved, the lower and cheaper grades of coffee are rendered almost equal to that of good Java in every respect. This feature, therefore, is of great consideration. The advantage, moreover, in thus treating coffee in sacks is very great in effecting a large saving in expense, preventing loss, and confining the rich aroma more entirely within the inclosed mass. By this means, moreover, a larger quantity can be matured, browned, and handled more readily than when spread out loose. Indeed, my new discovery is of the highest importance in every conceivable way, and bearing directly upon the traffic of coffee in every clime, and under every condition of the raw berry. It is obvious that my process and results can be carried out and effected by any suitable apparatus that will hold the coffee so that it will be confined to the action of the steam and dry air; but the accompanying drawing and description will illustrate one means of carrying into effect my invention by subjecting the coffee to the action of steam in sweating-boxes and drying it by external heat surrounding said boxes.

Figure 2:
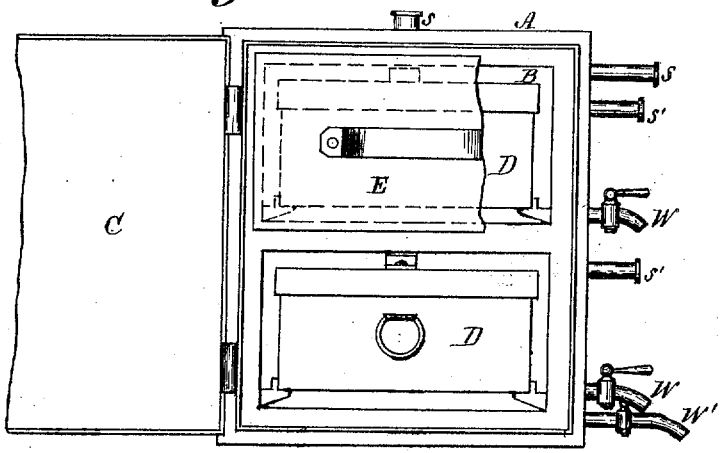

In the drawing, Figure 1 is a perspective view of an apparatus to admit steam and dry air to produce their intended effect upon the coffee therein. Fig. 2 is a front view of same. Figs. 3 and 4 are sectional views of the apparatus shown in Fig. 1.

A indicates the outer shell or frame, which may be made of metal or any other suitable material. B represents compartments, around which steam circulates, which is admitted through a pipe or pipes, *s*, and C the door covering the ovens B. D represents sweating-boxes, having perforations for the admission of steam when desired to be let into the compartments B through the pipes *s'*. The steam-pipes *s* and *s'* may have valves or stop-cocks by which to regulate the quantity of steam to be used in heating the space *e* or in the compartments B, there to have direct contact with the coffee in the sweating-boxes D through the perforations in them. E represents the doors of the compartments or sweating-oven. The door C incloses the ovens B and the sweating-boxes D, in order to economize heat and prevent as far as possible the radiation as well as the evaporation of the aroma of the coffee-berry. W W' represent valves whereby to draw off from the ovens or compartments the water resulting from the condensation of steam. V represents an ordinary safety-valve, a precautionary appliance in case the pressure of the steam should become too high.

Having described my invention, I claim—

1. The process of maturing and browning coffee, to increase its commercial and other value, by subjecting it to the direct action of steam.

2. The process of maturing and browning coffee, to increase its commercial and other value, by subjecting it to the sweating and expanding action of steam and the drying action of heat.

3. In the process of producing a yellow, brown, or golden color, to increase the commercial and other value of coffee, subjecting it both to the action of steam and heat while in sacks, and thus greatly lessening the labor and expense of the process, and increasing the rich aroma of the coffee.

4. In the process of maturing and coloring raw coffee, to increase its commercial and other value, the method of subjecting a series of sacks to the action of sweating steam and drying heat by arranging sacks in tiers, one above another, and having free communication one tier with another, so that the sweating steam will pass into said tiers of sacks so arranged, by means of coils of pipe or otherwise, as described.

In witness whereof I have hereunto signed the above specification of my process for maturing and browning coffee and in apparatus therefor this 1st day of July, A. D. 1871, in the presence of two subscribing witnesses.

JOHN ASHCROFT.

Witnesses:
A. E. H. JOHNSON,
J. W. HAMILTON JOHNSON.